United States Patent
Rajwar et al.

(10) Patent No.: US 8,180,977 B2
(45) Date of Patent: May 15, 2012

(54) TRANSACTIONAL MEMORY IN OUT-OF-ORDER PROCESSORS

(75) Inventors: Ravi Rajwar, Portland, OR (US); Haitham H. Akkary, Portland, OR (US); Konrad Lai, Vancover, WA (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 11/394,687

(22) Filed: Mar. 30, 2006

(65) Prior Publication Data

US 2007/0260942 A1 Nov. 8, 2007

(51) Int. Cl.
*G06F 12/00* (2006.01)

(52) U.S. Cl. ......... 711/154; 711/118; 711/147; 711/156

(58) Field of Classification Search .................. 711/118, 711/147, 154, 156
See application file for complete search history.

(56) References Cited

U.S. PATENT DOCUMENTS

| | | | |
|---|---|---|---|
| 5,428,761 A | 6/1996 | Herlihy et al. | |
| 5,652,859 A * | 7/1997 | Mulla et al. | 711/146 |
| 5,765,208 A * | 6/1998 | Nelson et al. | 711/204 |
| 5,835,961 A | 11/1998 | Harvey et al. | |
| 6,038,645 A | 3/2000 | Nanda | |
| 6,640,285 B1 | 10/2003 | Bopardikar et al. | |
| 6,681,293 B1 | 1/2004 | Solomon et al. | |
| 6,877,088 B2 | 4/2005 | Dice | |
| 6,895,527 B1 | 5/2005 | Quach et al. | |
| 7,216,202 B1 | 5/2007 | Chaudhry et al. | |
| 7,263,585 B2 | 8/2007 | Hooker | |
| 7,395,382 B1 | 7/2008 | Moir | |
| 7,809,903 B2 | 10/2010 | Adl-tabatabai | |
| 2002/0108025 A1 | 8/2002 | Shaylor | |
| 2003/0033510 A1 * | 2/2003 | Dice | 711/141 |
| 2004/0015642 A1 | 1/2004 | Moir et al. | |
| 2004/0034673 A1 | 2/2004 | Moir et al. | |
| 2004/0068618 A1 | 4/2004 | Hooker | |
| 2005/0235067 A1 | 10/2005 | Creta et al. | |
| 2006/0085591 A1 | 4/2006 | Kumar et al. | |
| 2006/0161740 A1 | 7/2006 | Kottapalli et al. | |
| 2006/0184840 A1 * | 8/2006 | Floyd et al. | 714/48 |
| 2006/0259589 A1 * | 11/2006 | Lerman et al. | 709/219 |
| 2006/0265557 A1 | 11/2006 | Peinado et al. | |
| 2006/0294326 A1 | 12/2006 | Jacobson et al. | |
| 2007/0043915 A1 | 2/2007 | Moir et al. | |

(Continued)

FOREIGN PATENT DOCUMENTS

WO WO/2007078538 7/2007

(Continued)

OTHER PUBLICATIONS

U.S. Appl. No. 60/673,445, Lerman et al., "Apparatus and Methods for Posting and Streaming Video," Apr. 2005.*

(Continued)

*Primary Examiner* — Michael Krofcheck
(74) *Attorney, Agent, or Firm* — Blakely, Sokoloff, Taylor & Zafman LLP

(57) ABSTRACT

Methods and apparatus to provide transactional memory execution in out-of-order processors are described. In one embodiment, a stored value corresponds to the number of transactional memory access requests that are uncommitted. The stored value may be used to provide nested recovery in case of an error, fault, etc. in accordance with a described embodiment.

31 Claims, 7 Drawing Sheets

U.S. PATENT DOCUMENTS

| | | | |
|---|---|---|---|
| 2007/0143287 A1 | 6/2007 | Adl-tabatabai | |
| 2007/0156780 A1 | 7/2007 | Saha et al. | |
| 2007/0156994 A1 | 7/2007 | Akkary et al. | |
| 2007/0162520 A1 | 7/2007 | Petersen et al. | |
| 2007/0186056 A1 | 8/2007 | Saha et al. | |
| 2007/0239797 A1* | 10/2007 | Cattell et al. | 707/201 |
| 2007/0283108 A1 | 12/2007 | Isherwood et al. | |
| 2008/0270745 A1 | 10/2008 | Saha | |

FOREIGN PATENT DOCUMENTS

| | | |
|---|---|---|
| WO | WO/2007078571 | 7/2007 |
| WO | WO-2007078883 A1 | 7/2007 |
| WO | 2007/115003 A1 | 10/2007 |

OTHER PUBLICATIONS

Herlihy, Maurice et al., "Transactional Memory: Architectural Support for Lock-Free Data Structures", Proceedings of Annual International Symposium on Computer Architecture., (1993), pp. 289-300.

Moir, M. "Hybrid Transactional Memory", *Annoucement Sun Microsystems*, (Jul. 2005), pp. 1-15.

Moir, M. "Hybrid Hardware/ Software Transactional Memory", Internet Citation, (2005), 23 pages.

Lie, S. "Hardware Support for Unbounded Transactional Memory", *Master's Thesis, Masscchusetts Institute of Techonology Department of Electrical Engineering and Computer Science.*, (May 7, 2004), pp. 85-102.

Chang, A. et al., "Architecture and Programming", *ACM Transactions on Computer Systems*, 6(1), (Feb. 1, 1988), pp. 28-52.

Lev, Y. et al., "Towards a Safer Interaction with Transactional Memory By Tracking Object Visibility", *Proceedings of synchronization And Concurrency in Object- Oriented Languages*, (Oct. 7, 2005), pp. 31-38.

*International Search Report and Written Opinion for Application No.* PCT/US2006/048041, (Jun. 12, 2007),12 pages.

Ananian, C. S., et al., "Unbounded Transactional Memory In: High Performance Computer Architecture", *11th International Symposium*, Edited by IEEE Computer Society,(2005), pp. 316-327.

*International Search Report and Written Opinion for application No.* PCT/US2007/064450, 12 pages.

Rajwar, Ravi et al., "Virtualizing Transactional Memory", 12 pages, 2005.

Harris, Tim et al., "Language Support for Lightweight Transactions", *ACM*, OOPSLA, (Oct. 2003), 15 pages.

Tanenbaum, A. S., "Structured Computer Organization", pp. 10-12, 1984.

Office Action received for U.S. Appl. No. 11/323,724 , mailed on Aug. 13, 2008, 23 pages.

Office Action for U.S. Appl. No. 11/323,724, mailed on Nov. 24, 2009, 17 pages.

Office Action received for U.S. Appl. No. 11/323,724, mailed on Mar. 24, 2009, 18 pages.

Office Action received for U.S. Appl. No. 11/323,724 mailed on Dec. 28, 2007, 13 pages.

Office Action received for U.S. Appl. No. 11/394,622, mailed on Dec. 29, 2008, 16 pages.

Office Action received for U.S. Appl. No. 11/394,622, mailed on May 28, 2008, 15 pages.

Office Action received for U.S. Appl. No. 11/394,622 , mailed on Aug. 14, 2009, 16 pages.

Office Action received for Chinese Patent Application No. 200710126654.9, mailed on Aug. 29, 2008, 5 pages of Office Action and 3 pages of English Translation.

Office Action received for U.S. Appl. No. 11/323,724, mailed on Jun. 2, 2010, 18 pages.

Notice of Allowance received for U.S. Appl. No. 11/303,529 , mailed on Jun. 2, 2010,8 pages.

Office Action received for U.S. Appl. No. 11/394,622, mailed on Apr. 14, 2010, 17 pages.

Ananian, C. Scott "Unbounded Transactional Memory", MIT Computer Science and Artificial Intelligence Laboratory, Jul. 2005, 15 Pages, Aug. 2007, 12 pages.

Office Action received for Chinese Patent Application No. 200680046532.2, mailed on Mar. 1, 2010, 10 pages.

PCT International Preliminary Report on Patentability, mailed Jun. 28, 2008, 7 pages.

Office Action received for TW Patent Application No. 096111333, mailed on Aug. 12, 2010, 10 pages.

Office Action received for U.S. Appl. No. 11/394,622 , mailed on Dec. 3, 2010, 16 pages.

Ennals, R., "Software Transactional Memory Should Not be Obstruction-Free", [online], [Retrieved Sep. 14, 2005], retrieved from the Internet at <URL:http://www.cambridge.intel-research.net/about.rennals/notlockfree.pdf>.

Hewlett-Packard Development Company, Memory-Relevant Portions of the Processor, [online], [Retrieved on Sep. 18, 2005], retrieved from the Internet at <URL:http://docs.hp.com/cgi-bin/pf-new.cgi?IN/=/en/5965-4641/ch01s05.html&prin-table=1>.

Lie, S., "An Integrated Hardware-Software Approach to Transactional Memory", 6.895 Theory of Parallel Systems, [Paper], pp. 1-18.

Lie, S., "An Integrated Hardware-Software Approach to Transactional Memory", 6.895 Theory of Parallel Systems, [Presentation], Monday Dec. 8, 2003.

Stenstrom, P., "A Survey of Cache Coherence Schemes for Multiprocessors", Computer, vol. 23, Issue 6, Jun. 1990, pp. 12-24.

Lev, Y., and J. Maessen, "Towards a Safer Interaction with Transactional Memory by Tracking Object Visibility", Proceedings of Synchronization and Concurrency in Object-Oriented Languages (SCOOL), Oct. 7, 2005, pp. 31-38, [XP-002432120].

Stonebraker, M "Virtual memory transaction management" Operating Systems Review USA, vol. 18, No. 2, Apr. 1984, pp. 8-16.

Sukha, J., "Memory-Mapped Transactions", Master's Thesis, Massachusetts Institute of Technology Department of Electrical Engineering and Computer Science, Jun. 2005, 92 pp., [XP-002434529].

Notice of Allowance from U.S. Appl. No. 11/394,622, mailed May 16, 2011, 6 pgs.

Notice of Allowance from U.S. Appl. No. 11/394,622, mailed Aug. 24, 2011, 5 pgs.

Ananian, "Unbounded Transactional Memory" MIT Computer Science and Artificial Intelligence Laboratory, Feb. 2004, pp. 9-10.

Final Office Action from U.S. Appl. No. 11/323,724, mailed Aug. 3, 2011, 21 pgs.

Office action from counterpart foreign German Patent Application No. 11 2007 000 812.1 mailed Nov. 2, 2011, 18 pages.

Office action from counterpart foreign Great Britain Patent Application No. GB0812727.6, mailed Jan. 28, 2011, 2 pages.

First office action from counterpart foreign Great Britain Patent Application No. GB0812727.6, mailed Aug. 13, 2010, 2 pages.

* cited by examiner

| # | Class | Name | Action | DESCRIPTION |
|---|---|---|---|---|
| 1 | Execution State (exec_state) | X_IDLE | | NO TRANSACTIONAL ACTIVITY |
| 2 | | X_ACTIVE | | IN ATOMIC BLOCK |
| 3 | | X_ABORTED | | ATOMIC BLOCK ABORTED |
| 4 | | X_COMMITTING | | ATOMIC BLOCK BEING COMMITTED |
| 5 | | X_ABORTING | | ATOMIC BLOCK BEING ABORTED |
| 6 | Attempt State (attempt_state) | A_IDLE (00) | | NO ABORTS |
| 7 | | A_ABORT_FIRST (01) | | THE FIRST ABORT |
| 8 | | A_ABORT_MULTIPLE (1X) | | SUBSEQUENT ABORTS |
| 9 | Source of Handler call (source) | S_ABORT_INST_RETIRED | | EXPLICIT ABORT BY PROGRAMMER |
| 10 | | S_DISALLOWED_INSTTYPE | TXFR = IP | - SYSCALL, OTHER INSTRUCTIONS THAT MAY CHANGE EXECUTION PRIVILEGE LEVEL<br>-I/O INSTRUCTIONS |
| 11 | | S_RESOURCE_SET_CONFLICT | TXFR = IP<br>TXDR = Addr | - LIMITED CACHE SPACE<br>- RETRY MAY TO FAIL |
| 12 | | S_DISALLOWED_MEMTYPE | TXFR = IP<br>TXDR = Addr | -ONLY WB MEMORY TYPE IS ALLOWED<br>- RETRY LIKELY TO FAIL |
| 13 | | S_EXCEPTION | TXFR = fault/abort/trap IP | MAY BE SET TO INDICATE TRANSACTION ABORT DUE TO EXECUTION EXCEPTION, FAULT, OR TRAP |
| 14 | | S_INTERRUPT | | MAY BE SET TO INDICATE TRANSACTION ABORT DUE TO EXTERNAL INTERRUPT |
| 15 | | S_DATA_CONFLICT_CLEAN | TXDR = Addr | - RETRY MAY NOT SHOW A CONFLICT<br>- HARDWARE PRIORITIES MAY ELIMINATE THESE EVENTS |
| 16 | | S_DATA_CONFLICT_DIRTY | TXDR = Addr | - RETRY MAY NOT SHOW A CONFLICT<br>- HARDWARE PRIORITIES MAY ELIMINATE THESE EVENTS |
| 17 | | X_OVF_COMMITING | | -INDICATES AN OVERFLOW ATOMIC BLOCK IS COMMITTING<br>-MAY BE LOADED BY A MICROCODE ASSIST ON A SNOOP HIT IN M_XSW |
| 18 | | X_OVF_ABORTING | | -INDICATES AN OVERFLOW ATOMIC BLOCK IS ABORTING<br>-MAY BE LOADED BY A MICROCODE ASSIST ON A SNOOP HIT IN M_XSW |
| 19 | Control | C_RTM_MODE | | RUNS IN RTM MODE |
| 20 | | C_NON_GATED_OPS | | WHEN SET, LOADS AND STORES ARE EXECUTED AS NON-GATED LOADS AND STORES. (E.G., MAY BE SIMILAR TO A TRANSACTION SUSPEND) ONCE THIS MODE IS ENTERED, ANOTHER TXMBEG PRIOR TO A RESUME MAY CAUSE A FAULT.) |

FIG. 5

US 8,180,977 B2

TRANSACTIONAL MEMORY IN OUT-OF-ORDER PROCESSORS

BACKGROUND

The present disclosure generally relates to the field of electronics. More particularly, an embodiment of the invention relates to Transactional Memory™ execution in out-of-order processors.

To improve performance, some computer systems may execute multiple threads concurrently. Generally, before a thread accesses a shared resource, it may acquire a lock of the shared resource. In situations where the shared resource is a data structure stored in memory, all threads that are attempting to access the same resource may serialize the execution of their operations in light of mutual exclusivity provided by the locking mechanism. This may be detrimental to system performance and may cause program failures, e.g., due to deadlock bugs.

To reduce performance loss resulting from utilization of locking mechanisms, some computer systems may use transactional memory. Transactional memory generally refers to a synchronization model that allows multiple threads to concurrently access a shared resource without utilizing a locking mechanism. Transactional memory execution in out-of-order processors, however, may add complexity to a design, for example, due to mispredictions resulting from speculative processing which occurs in out-of-order processors.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 5 illustrates an embodiment of a transaction status and control register.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Figure 1:
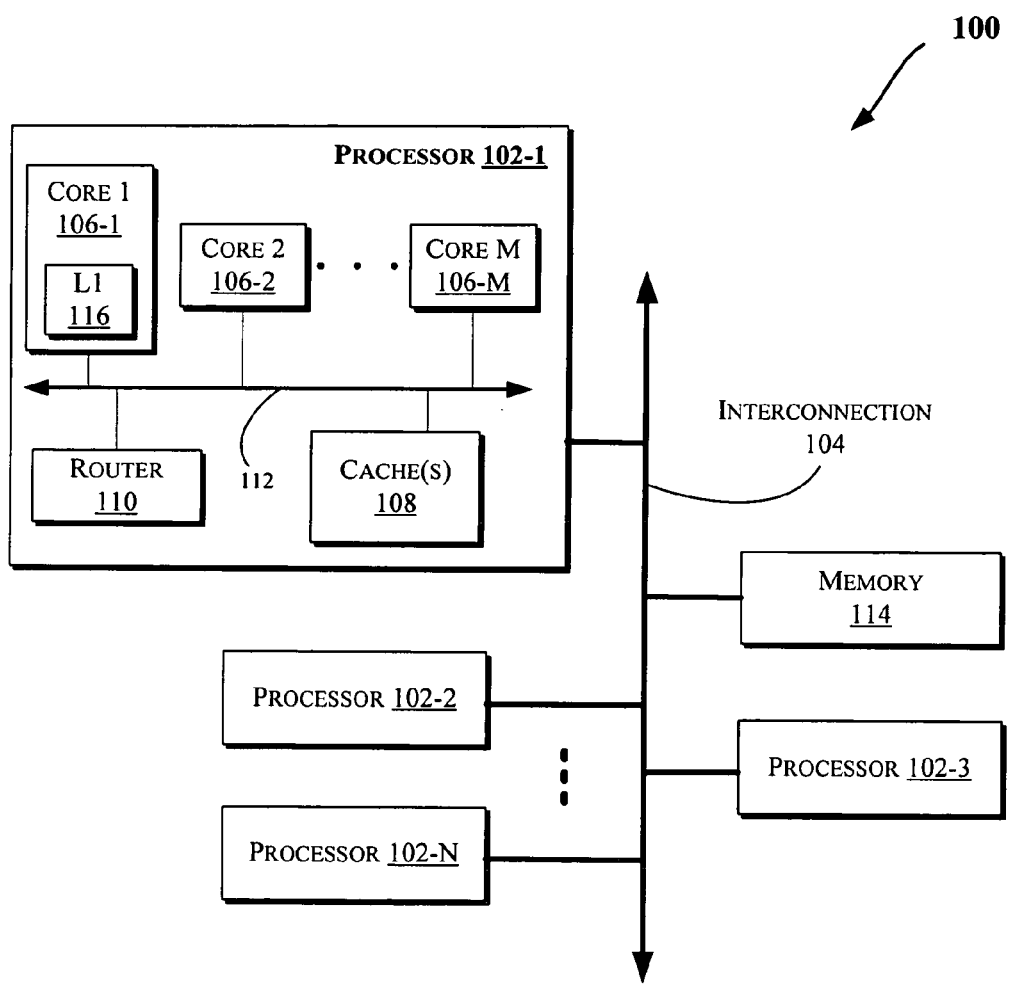
FIGS. 1, 6, and 7 illustrate block diagrams of embodiments of computing systems, which may be utilized to implement various embodiments discussed herein.

Some of the embodiments discussed herein may provide efficient mechanisms for transactional memory execution in out-of-order processors, such as the processors discussed with reference to FIGS. 1-7. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may include one or more private or shared caches), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers, or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 may be a last level cache (LLC). Also, each of the cores 106 may include a level 1 (L1) cache (116) (generally referred to herein as "L1 cache 116"). Furthermore, the processor 102-1 may also include a mid-level cache that is shared by several cores (106). Various components of the processor 102-1 may communicate with the cache 108 directly, through a bus (e.g., the bus 112), and/or a memory controller or hub.

Figure 2:
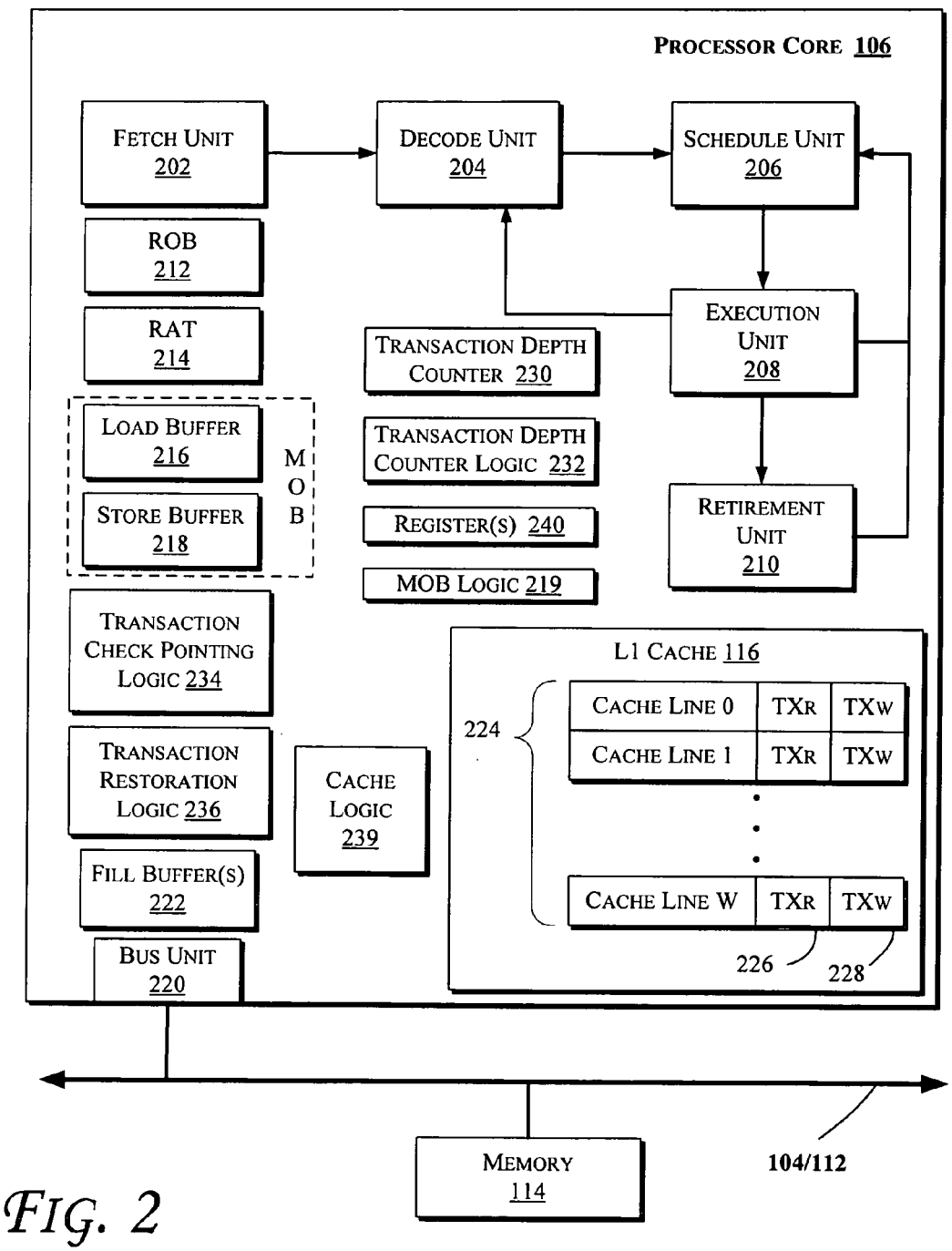
FIG. 2 illustrates a block diagram of portions of a processor core, according to an embodiment of the invention.

FIG. 2 illustrates a block diagram of portions of a processor core 106, according to an embodiment of the invention. In one embodiment, the arrows shown in FIG. 2 illustrate the flow of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components. In an embodiment, the processor core 106 shown in FIG. 2 may be utilized to execute transactional memory access requests in hardware (which may be referred to herein generally as Restricted Transactional Memory®).

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 6 and 7. The core 106 may also include a decode unit 204 to decode the fetched instruction. For instance, the decode unit 204 may decode the fetched instruction into a plurality of uops (micro-operations).

Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

As shown in FIG. 2, the core 106 may include a reorder buffer (ROB) 212 to store information about in flight instructions (or uops) for access by various components of the processor core 106. The core 106 may further include a RAT (register alias table) 214 to maintain a mapping of logical (or architectural) registers (such as those identified by operands of software instructions) to corresponding physical registers. In one embodiment, each entry in the RAT 214 may include an ROB identifier assigned to each physical register. Additionally, a load buffer 216 and a store buffer 218 (which may be referred to collectively herein as memory order buffer (MOB)) may store pending memory operations that have not loaded or written back to a main memory (e.g., a memory that is external to the processor core 106, such as memory 114), respectively. An MOB logic 219 may perform various operations relating to the buffers 216 and 218 such as discussed herein, for example, with reference to FIGS. 3 and 4.

Furthermore, the processor core 106 may include a bus unit 220 to allow communication between components of the processor core 106 and other components (such as the components discussed with reference to FIG. 1) via one or more buses (e.g., buses 104 and/or 112). One or more fill buffers 222 may temporary store data that is received (e.g., over the buses 104 and/or 112) from the memory 114 prior to storing the received data into the cache 116.

As shown in FIG. 2, the cache 116 may include one or more cache lines 224 (e.g., cache lines 0 through W). In an embodiment, each line of the cache 116 may include a transaction read bit 226 and/or a transaction write bit 228 for each thread executing on the core 106. Bits 226 and 228 may be set or cleared as discussed with reference to FIG. 3, e.g., to indicate (load and/or store) access to the corresponding cache line by a transactional memory access request. Also, even though in FIG. 2, each cache line 224 is shown as having a respective bit 226 and 228, other configurations are possible. For example, a transaction read bit 226 (or transaction write bit 228) may correspond to a select portion of the cache 116, such as a cache block or other portion of the cache 116. Also, the bits 226 and/or 228 may be stored in locations other than the cache 116, such as in the cache 108 of FIG. 1, the memory 114, or a victim cache, for example.

As will be further discussed with reference to FIG. 3, the core 106 may include a transaction depth counter 230 to store a value corresponding to the number of transactional memory access requests that remain uncommitted. For example, the value stored in the counter 230 may indicate the nesting depth of multiple transactional memory access requests that correspond to the same thread. In one instance, multiple transactional memory access requests may result when one transaction is initiated inside a pending transaction (such as via a library call or other nested procedure). The counter 230 may be implemented as any type of a storage device such as a hardware register or a variable stored in a memory (e.g., the memory 114 or cache 116). The core 106 may also include a transaction depth counter logic 232 to update the value stored in the counter 230. Additionally, as will be further discussed with reference to FIG. 3, the core 106 may include a transaction check pointing logic 234 to check point (or store) the state of various components of the core 106 and a transaction restoration logic 236 to restore the state of various components of the core 106. The core 106 may also include a cache logic 239 which may perform various operations by accessing the cache 116, as will be further discussed herein with reference to FIGS. 3 and 4, for example. Additionally, the core 106 may include one or more additional registers 240 that correspond to various transactional memory access requests, such as transaction status and control (TXSR) (which is further discussed herein with reference to FIG. 4), transaction instruction pointer (TXIP) (e.g., that may be an instruction pointer to an instruction at the beginning (or immediately preceding) the corresponding transaction), and/or transaction stack pointer (TXSP) (e.g., that may be an stack pointer to the head of a stack that stores various states of one or more components of the core 106), as will be further discussed with reference to FIG. 3.

Figure 3:
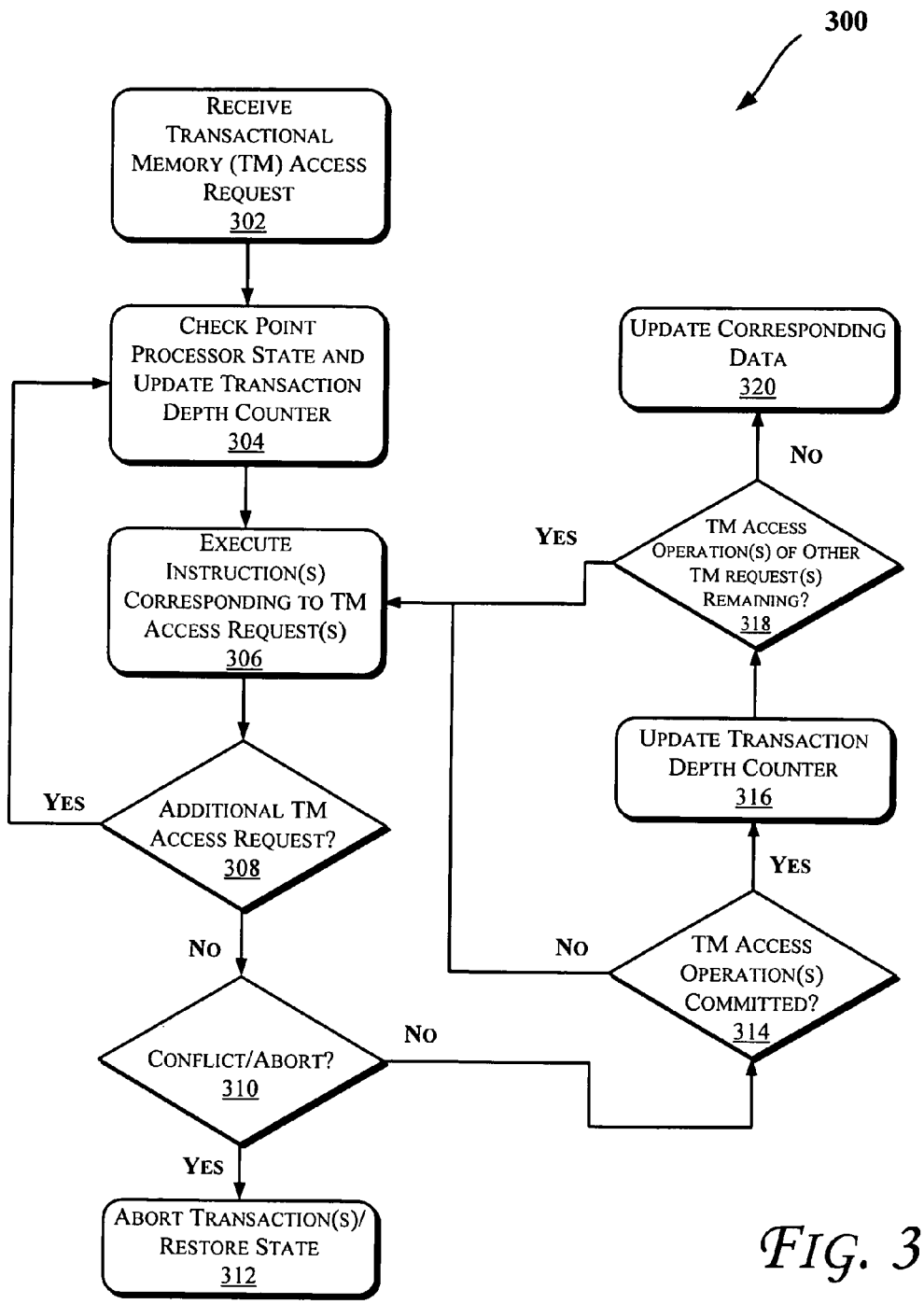
FIGS. 3-4 illustrate block diagrams of methods in accordance with various embodiments of the invention.

More specifically, FIG. 3 illustrates a block diagram of an embodiment of a method 300 to execute one or more operations corresponding to a transactional memory access request. In an embodiment, various components discussed with reference to FIGS. 1-2 and 6-7 may be utilized to perform one or more of the operations discussed with reference to FIG. 3.

Referring to FIGS. 1-3, at an operation 302, a transactional memory access request (such as one or more memory load or store operations) is received. For example, the fetch unit 202 may fetch an instruction that indicates the start of a transactional memory execution. In accordance with at least one instruction set architecture, the instruction indicating the start of a transactional memory execution may be TXMBEG <user_handler_IP>, where user_handler_IP identifies a user handler procedure to which execution may be redirected in case of an abort, error, or other fault conditions. Also, a transactional end instruction (such as TXMEND in accordance with at least one instruction set architecture) may indicate the end of a transaction. In one embodiment, all operations between the TXMBEG instruction and TXMEND may be marked as transactional. In an embodiment, the transactional operations may default to be transactional (and explicitly non-transactional, for example, through an instruction prefix or parameter), e.g., allowing non-transactional legacy libraries to be used transactionally without code changes. Alternatively, the transactional operations may default to be non-transactional (and explicitly transactional, for example, through an instruction prefix or parameter). In an embodiment, special set of explicit non-transactional instructions may be utilized that are treated non-transactionally even though they may appear within a transaction, e.g., between a TXMBEG instruction and a TXMEND instruction. Also, in an embodiment, non-transactional store operations occurring within a transaction (e.g., between a TXMBEG instruction and a TXMEND instruction) may be executed by the execution unit 208 as write-through operations to the memory 114. In one embodiment, the setting for the default treatment of the operations may be provided with the TXMBEG instruction, e.g., provided through a corresponding parameter or prefix. In an embodiment, the setting for the default may be provided through a mode bit in a control register.

At an operation 304, the logic 232 may update the counter 230 (e.g., may increment or decrement the counter 230, depending on the implementation). In one embodiment, the execution of the TXMBEG instruction (e.g., by the execution unit 208) may result in updating of the counter 230. Alternatively, the counter 230 may be updated at issue time, e.g., when the schedule unit 206 issues the TXMBEG instruction. Also, at operation 304, the transaction check pointing logic 234 may check point the state of various components (e.g., counter 230 and/or registers 240). For example, the logic 234 may store the state of one or more components of the core 106 in a storage device (e.g., in the cache 116, cache 108, and/or memory 114). As will be further discussed herein, since the core 106 may process more than one transactional memory access request at the same time (and/or speculatively), the logic 234 may store more than one state of various components of the core 106, and in one embodiment the various check pointed states may be stored to a data structure that is implemented as a stack. In an embodiment, the logic 234 may store a check-pointed state corresponding to the outermost transactional memory request.

At an operation 306, one or more instructions (or operations) corresponding to the transactional memory access request of the operation 302 may be executed, e.g., by the execution unit 208. During execution of instructions at operation 306, each time a portion of the cache 116 is accessed, the corresponding bit (e.g., bits 226 and/or 228 may be updated, for example, set or cleared depending on the implementation). For example, cache logic 239 may identify transactional instructions that are accessing the cache 116 and update the corresponding bits 226 and/or 228. In one embodiment, the instructions of operation 306 may be identified explicitly or implicitly as being a transactional or non-transactional operation, for example, by using a prefix (or control bit) that may be provided with the instruction and/or stored in a corresponding location, such as within a corresponding entry of the ROB 212.

At an operation 308, if another transactional memory access request is received, the method 300 continues with the operation 304. Otherwise, if no additional transactional memory access requests are received at operation 308, at an operation 310, it is determined whether a conflict or abort condition corresponding to execution of the instructions of the operation 306 exists. If there is a conflict with another instruction (which may be an instruction corresponding to another thread, e.g., executing on the same or a difference processor core), the transaction is aborted at an operation 312. For example, a conflicting instruction may send a snoop invalidate for an entry in the cache 116 that the transaction of operation 302 is accessing (or has marked as being accessed, as indicated by a value stored in bits 226 and/or 228). Moreover, if the transaction write bit 228 of the portion of the cache 116 indicates a previous write access to the same portion of the cache, a snoop read request from another thread to the same portion of the cache 116 may be aborted at operation 312. Also, the abort at operation 310 may be due to an implementation-specific event that forces an abort (e.g., an uncacheable (UC) event, an I/O event, a buffer overflow, etc.)

In an embodiment, if a snoop results in invalidation of data stored in memory (such as stored in the cache 116), the load instruction at the head of the load buffer 216 may be included in the snoop check and a full address check may be performed (instead of a partial address check), e.g., by the MOB logic 219. If the load instruction at the head of the load buffer 216 conflicts with the snoop at operation 310, the corresponding transactional memory request may be aborted at operation 312. Alternatively, an explicit abort request may cause performance of operation 310. For example, in accordance with at least one instruction set architecture, the instruction indicating the abort of a transactional memory execution may be TXMABT. The abort instruction may result in explicit abort which, in case of multiple nested transactional memory access requests (e.g., as indicated by the value stored in the counter 230), may result in roll-back to a prior state and calling the corresponding handler (e.g., innermost handler in case of multiple pending transactional memory access requests that may be identified with the corresponding TXMBEG instruction such as discussed with reference to operation 302). In one embodiment, the abort may result in roll-back to the check pointed state corresponding to the outermost transaction and calling the corresponding outermost TXMBEG handler. In one embodiment, at operation 312, the transaction restoration logic 236 may restore various components of the core 106 to a previous state such as discussed with reference to FIG. 2.

In an embodiment, the check pointing at operation 304 may be performed by using a copy-on-write mechanism to record register recovery state in a bit present in registers 240 and/or a corresponding entry of the RAT 214. For example, a 1-bit array may be associated with each RAT instantiation (alternatively only one such array may be used). While the value stored in the counter 230 indicates a pending transaction (e.g., TXND>0 in one embodiment), then while the decode unit 204 is performing a register rename operation, the array is checked. If the corresponding bit indicates no previous access, then a uop is inserted into the instruction flow and the ROB 212 to write the corresponding data into one of the registers 240, e.g., prior to the rename. If the corresponding bit indicates a previous access, no copying is necessary since the corresponding data has already been copied prior to a write. If a branch misprediction occurs, the various 1-bit arrays may be logically OR-ed together, e.g., to form the starting array going forward. If this is done, then repeated mispredictions may not result in repeated copy-on-write operations since one copy of a given data is guaranteed to exist in a register of the core 106. This may limit the performance overhead of copy-on-write.

In one embodiment, when the cache 116 is evicted, the entries that have an active (e.g., set) bit 226 or bit 228 may be evicted last. If no further available space remains in the cache 116, the program execution may be redirected to a user handler (such as the handler of the corresponding TXMBEG instruction). Additionally, the fill buffers 222 may be used to service non-transactional operation(s) (e.g., store data) while a transaction is active but temporarily suspended.

If no conflicts exist, at an operation 314, it is determined whether the transactional memory access operation(s) corresponding to a transactional memory access request (e.g., as identified by a TXMBEG and a corresponding TXMEND instruction) are successfully committed (e.g., by the retirement unit 210). If the transactional memory access operation(s) remain uncommitted, the method 300 continues with the operation 306 to execute the corresponding instruction(s). Once the transactional memory access operation(s) corresponding to a transactional memory access request are successfully committed, the logic 232 updates the counter 230 at an operation 316. In one embodiment, execution (e.g., by the execution unit 208) or issuance (e.g., by the schedule unit 206) of the TXMEND instruction may result in commitment of a transactional memory access request, and hence performance of operation 316.

At an operation 318, it is determined whether any transactional memory access operation(s) corresponding to other transactional memory access requests remain uncommitted. In one embodiment, operation 318 may be performed by logic 232, for example, by determining whether the value stored in the counter 230 indicates existence of remaining transactional memory access requests (e.g., when the counter 230 is not clear in an embodiment). If other operation(s) remain to be executed at operation 318, the method 300 continues with the operation 306. Once no further operations corresponding to transactional memory access requests remain (e.g., the counter 230 is clear), at an operation 320, the corresponding data (e.g., within the cache 116, cache 108, and/or memory 114) are updated atomically in accordance with operations of the committed transactional memory access request(s). Also, the TXMEND instruction may indicate a commit point for the corresponding transactional memory access request if the value stored in the counter 230 indicates that the TXMEND corresponds to the outermost transactional memory access (e.g., when the counter 230 is clear). In one embodiment, the corresponding bits 226 and/or 228 may also be updated (e.g., cleared in an embodiment) to indicate that no further transactional memory access requests are pending in the core 106. Accordingly, the TXMEND instruction may result in an atomic commit, e.g., by ensuring that all speculation and/or exceptions have been resolved, all cache blocks that belong to the transaction write set are in exclusive state, and/or all blocks that belong to the read set are currently present and valid. Read or write sets as discussed herein may generally refer to sets of data within memory (e.g., cache 116) that correspond to bits 226 and 228, respectively. In an embodiment, the incoming snoops are stalled while the corresponding write set is being committed.

In one embodiment, the core 106 may execute various instructions (or operations) discussed with reference to the method 300 speculatively, as will be further discussed with reference to FIG. 4. Also, various operations of the method 300 may be performed out-of-order. For example, operations 306, 308, and 310 may be performed in any order. Moreover, in an embodiment, snoop requests may be stalled prior to performance of operations 310, 312, 314, and/or 320 and unstalled after performance of operations 310, 312, 314, and/or 320.

Figure 4:
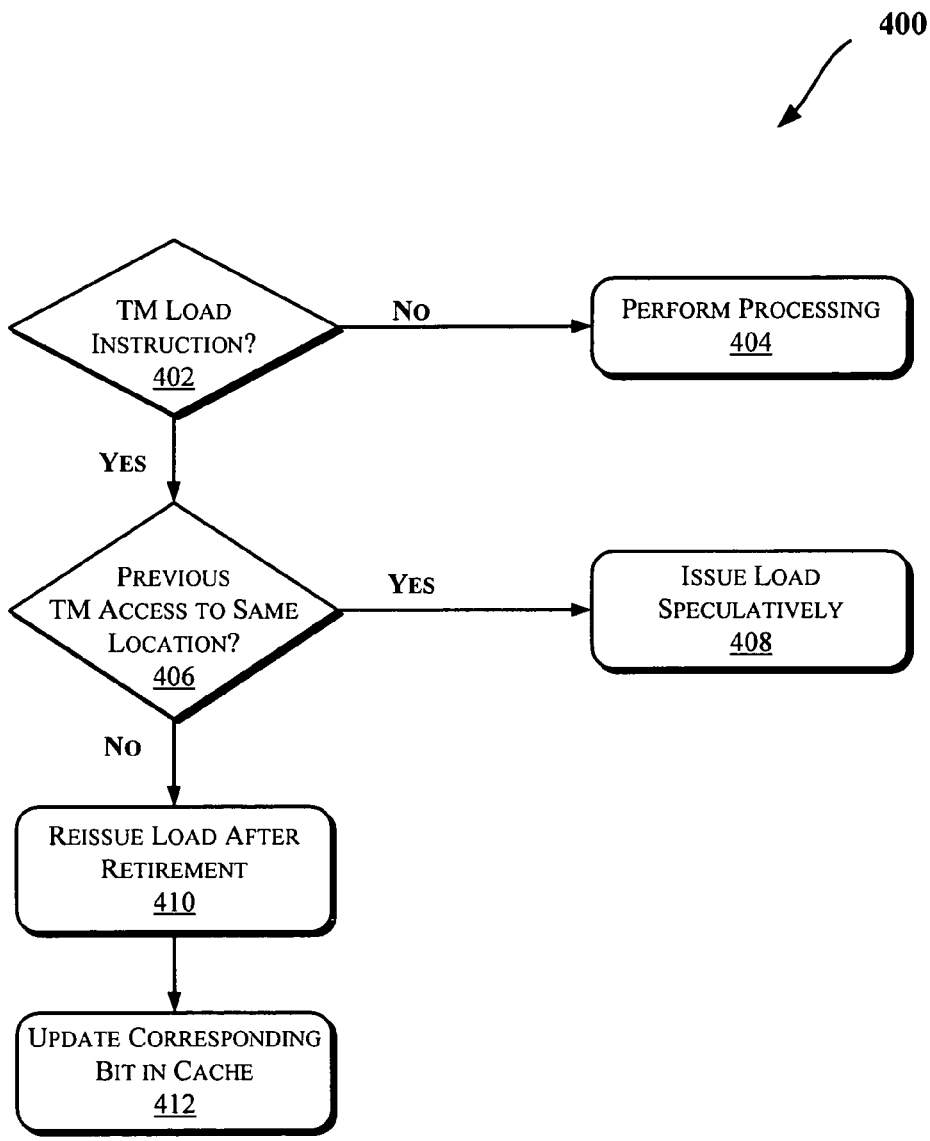

FIG. 4 illustrates a block diagram of an embodiment of a method 400 to execute one or more load operations corresponding to a transactional memory access request. In an embodiment, various components discussed with reference to FIGS. 1-2 and 6-7 may be utilized to perform one or more of the operations discussed with reference to FIG. 4.

Referring to FIGS. 1-4, at an operation 402, the decode unit 204 may decode a fetched instruction and determine whether the fetched instruction corresponds to a transactional memory access load operation. If the instruction does not correspond to a transactional memory access load operation, the core 106 may process the instruction accordingly (404). For example, for a transactional memory access store operation, the core 106 may issue the store operation (or instruction) to the cache 116 after retirement of the corresponding transactional memory access request. In one embodiment, address or data corresponding to the store operation may be computed speculatively and stored in the store buffer 218. Once the corresponding transactional memory access request retires, the store may be issued to the cache in accordance with the pre-computed data. In an embodiment, the retired store may further cause setting of the accessed cache block (e.g., the corresponding TXw bit 228) if the bit is not set when the store is issued to the cache 116.

At an operation 406, the logic 239 may determine whether a previous transactional memory access request accessed the same location in the cache 116 that being addressed by the load instruction of the operation 402. In one embodiment, the logic 239 may access the corresponding bit 226 of the cache 116 to perform operation 406. If the same location has been accessed previously, the schedule unit 206 may issue the load instruction speculatively. Otherwise, the MOB logic 219 may then reissue the load instruction after retirement (or commitment as indicated by a corresponding entry of the ROB 212) at an operation 410 and then set the corresponding TXr bit 226 in the cache 116 at operation 412. In one embodiment, the corresponding bit 226, if accessed by a previous transactional load, may be also stored in the load buffer 216. Once a load operation is committed, as indicated by a corresponding entry of the ROB 212, the ROB 212 may send a signal to the load buffer 216 (or MOB logic 219) to indicate that the corresponding load operation is committed. Hence, providing the bit 226 in the load buffer 216 may limit re-access of the cache 116 for operations 410 and 412, e.g., to optimize the cache bandwidth.

In one embodiment, load or store operations of a transactional memory access request may be identified implicitly or explicitly as being transactional or non-transactional operations, e.g., by allowing loads to issue without serializations and without updating read or write sets, but re-accessing the cache 116 when the operation is at the head of the corresponding load or store buffer (e.g., buffers 216 or 218 respectively) to explicitly identify the load or store address as belonging to the transaction read or write set. This allows loads and stores to speculatively issue without incorrectly updating the read write sets and thus allows for precision in identification of loads and stores, and may further automatically handle branch mispredictions. The store operations may update the read write sets when the store instructions leave the oldest portion of the store buffer 218 (which may be referred to as a senior store queue in an embodiment). Moreover, implicit inclusion may allow legacy libraries to be supported by the embodiments discussed herein.

FIG. 5 illustrates an embodiment of a transaction status and control register (TXSR) 500. In one embodiment, the TXSR register 500 may be used to implement various embodiments discussed herein, e.g., with reference to FIGS. 2-3. For example, the registers 240 of FIG. 2 may include the TXSR register 500 in one embodiment. Moreover, the operations discussed with reference to FIGS. 2-4 may be performed by accessing the register 500.

As shown in FIG. 5, the TXSR register 500 may include one or more entries 502 (or bits in an embodiment). Each entry 502 may have the illustrated name (504) in accordance with at least one instruction set architecture. Also, each entry 502 may have a corresponding class 506, e.g., to group bits that are similar in one category. FIG. 5 additionally shows a description 508 corresponding to each entry 502. In an embodiment, the class information 506 and description 508 are for informational purposes and may not be stored in the actual register 500. In one embodiment, if one of the entries 502 indicates the status identified by the description 508, one or more actions 510 may be taken. In FIG. 5, TXDR and TXFR may be registers (e.g., included with the registers 240 of FIG. 2) for debug purposes. For example, TXDR may store the address of a memory instruction or the snoop address of a data conflict before a transaction aborts operation. Moreover, TXFR may store the instruction pointer (IP) of a faulting instruction that has caused a transaction to abort. In one embodiment, the values stored in TXDR and TXFR may be read by a transaction handler routine (e.g., a handler that is identified by the TXMBEG) after the abort to allow software to determine the addresses that caused the abort.

Referring to FIGS. 1-5, in an embodiment, the TXMBEG instruction discussed with reference to FIG. 3 may perform one or more of the following two actions depending upon the status of the TXSR register 500:

1. The TXMBEG instruction may transition execution into an atomic execution mode where operations following the instruction are executed in a recoverable mode. Any updates performed by instructions while the core 106 is in this mode can be discarded at any time. To allow register state recoverability, some of the registers 240 may be check pointed by the logic 234. Operations that cannot be undone if executed may result in an error, transaction updates discarded, and/or control transferred to the handler identified by the TXMBEG instruction.

2. The TXMBEG instruction may also do a conditional control transfer depending upon the state of the TXSR register 500. If the appropriate TXSR bits are set, the TXMBEG instruction may transfer program control to a different point in the instruction stream corresponding to the transactional memory access request without recording return information. The destination (target) operand may specify the address to which the instruction is jumping. When a TXMBEG performs a conditional control transfer, the core 106 may not transition into a recoverable execution mode, and execution may be similar to that of a JMP (or jump) instruction in accordance with at least one instruction set architecture.

In an embodiment, the following pseudo code may illustrate the operations discussed above with reference to some entries 502 of register 500 shown in FIG. 5:

```
IF TXSR.exec_state = X_ABORTED
    THEN
            JMP to destination operand address
    ELSE
            IF TXSR.exec_state = X_ACTIVE
                THEN
                        TXND <- TXND + 1
                        ckptSP = SP
                ELSE
                        TXND <- 1
                        TXSR.exec_state = X_ACTIVE
                        ckptSP = SP
                        ckptIP = IP (of outermost begin atomic)
            FI
FI
```

In the above code, in addition to the SP register, a plurality of registers (e.g., registers 240) may be saved. In one embodiment, the set of registers to be saved may be communicated by the software to the hardware. Referring to FIGS. 1-5, in an embodiment, the TXMEND instruction discussed with reference to FIG. 3 may perform the following pseudo code depending upon the status of the TXSR register 500 (in one embodiment, tmpmemstatus below may be a state continuously gated to indicate whether all cache blocks in the cache 116 are in an appropriate state):

```
IF TXSR.exec_state != X_ACTIVE
    THEN
            Illegal Opcode_ERROR
FI
IF —TXND != 0
    THEN
            Done; (*nested block retired *)
FI
IF (RTM)
    THEN
            IF (tmpmemstatus)
                THEN
                        TXSR.exec_state = X_COMMITTING
                        commit_cache_rtm_mode()
                        TXSR <- 0
```

-continued

```
                        Done
                ELSE (* could not commit memory state *)
                        TXSR.exec_state = X_ABORTING
                        abort_cache_rtm_mode()
                        TXSR.exec_state = X_ABORTED
                        TXSR.attempt_state++ (* to track the number of
                                                failed attempts *)
                        JMP to TXIP
                (* restore SP etc. *)
FI
```

Referring to FIGS. 1-5, in an embodiment, the TXMABT instruction discussed with reference to FIG. 3 may allow a user to explicitly abort the atomic block execution. The effect may be similar to when the execution aborts, and all updates are discarded (except for the register 500 bits). In one embodiment, the TXMABT instruction may perform the following pseudo code depending upon the status of the TXSR register 500:

```
IF TXSR.exec state != X_ACTIVE
    THEN
            Illegal Opcode_ERROR
FI
discard_speculative_updates_cache()
restore_architectural_register_state() (* SP/IP *)
TXSR.exec_state = X_ABORTED
TXSR.attempt_state++
JMP to TXIP
```

In an embodiment, Table 1 below shows sample cache states (e.g., of the cache 116 of FIG. 2), bit values for bits 226 and 228 of FIG. 2, and a corresponding description. In Table 1, "M" indicates a modified cache state, "E" indicates an exclusive cache state, "S" indicates a shared cache state, "I" indicates an invalid cache state, "X" indicates a do not care state, and "N/A" means non-applicable.

TABLE 1

Sample Cache State and Bit Description

| $TX_R$ | $TX_W$ | CACHE STATE | DESCRIPTION |
|---|---|---|---|
| 0 | 1 | MESI | N/A (if TXw set, then TXr is also set) |
| 1 | X | I | N/A (TX bits have no meaning if cache state is invalid) |
| 1 | 1 | ES | N/A (ES cache line cannot be dirty) |
| 0 | 0 | X | no additional meaning |
| 1 | 0 | MES | Line read within transaction (If M, then line is dirty in cache, has been read in transaction but not written to in transaction.) |
| 1 | 1 | M | Line written to within transaction. Earlier value has been written back to the next level. |

In an embodiment, Table 2 below shows processor core 106 requests, cache states (e.g., of the cache 116 of FIG. 2), bit values for bits 226 and 228 of FIG. 2, and a corresponding action. In Table 2, "M" indicates a modified cache state, "E" indicates an exclusive cache state, "S" indicates a shared cache state, "I" indicates an invalid cache state, "X" indicates a do not care state, "LD" means a load request, "ST" means a store request, "LDntx" means an explicit non-transaction load request, "STntx" means an explicit non-transaction store request, "Done" means no additional operations over what already would happen in the baseline system (the existing cache hit condition with no other action), "[TXr=? TXw=?]" shows the final state of the cache block for that event, "NA"

means this entry should not occur, "FAULT" means an error condition may be flagged, and "Issue miss" a miss request will be issued.

TABLE 2

Sample Core Request, Cache State, Bit Value, and Action

| Core Req. | $TX_R$ | $TX_W$ | Cache State | Action |
|---|---|---|---|---|
| X | 0 | 1 | MESI | NA |
| X | 1 | X | I | NA |
| X | 1 | 1 | ES | NA |
| LD | 0 | 0 | MES | [TXr = 1 TXw = 0] |
| LD | 1 | 0 | MES | Done |
| LD | 1 | 1 | MES | Done |
| LD | 0 | 0 | I | Issue miss [TXr = 1 TXw = 0] |
| ST | 0 | 0 | M | WB_first_retain_own() [TXr = 1 TXw = 1] |
| ST | 0 | 0 | E | [TXr = 1 TXw = 1] |
| ST | 0 | 0 | S | Issue miss (w/o data transfer) [TXr = 1 TXw = 1] |
| ST | 0 | 0 | I | Issue miss [TXr = 1 TXw = 1] |
| ST | 1 | 0 | M | WB_first_retain_own() [TXr = 1 TXw = 1] |
| ST | 1 | 0 | E | [TXr = 1 TXw = 1] |
| ST | 1 | 0 | S | Issue miss (w/o data transfer) [TXr = 1 TXw = 1] |
| ST | 1 | 1 | M | Done |
| LDntx | 0 | 0 | I | Issue miss [TXr = 0 TXw = 0] |
| LDntx | 1 | X | MES | Done |
| LDntx | 0 | 0 | MES | Done |
| STntx | 0 | 0 | S | Issue miss (w/o data transfer) [TXr = 0 TXw = 0] |
| STntx | 0 | 0 | I | Issue miss [TXr = 0 TXw = 0] |
| STntx | 0 | 0 | ME | Done |
| STntx | 1 | 0 | MES | FAULT |
| STntx | 1 | 1 | M | FAULT |

Figure 6:
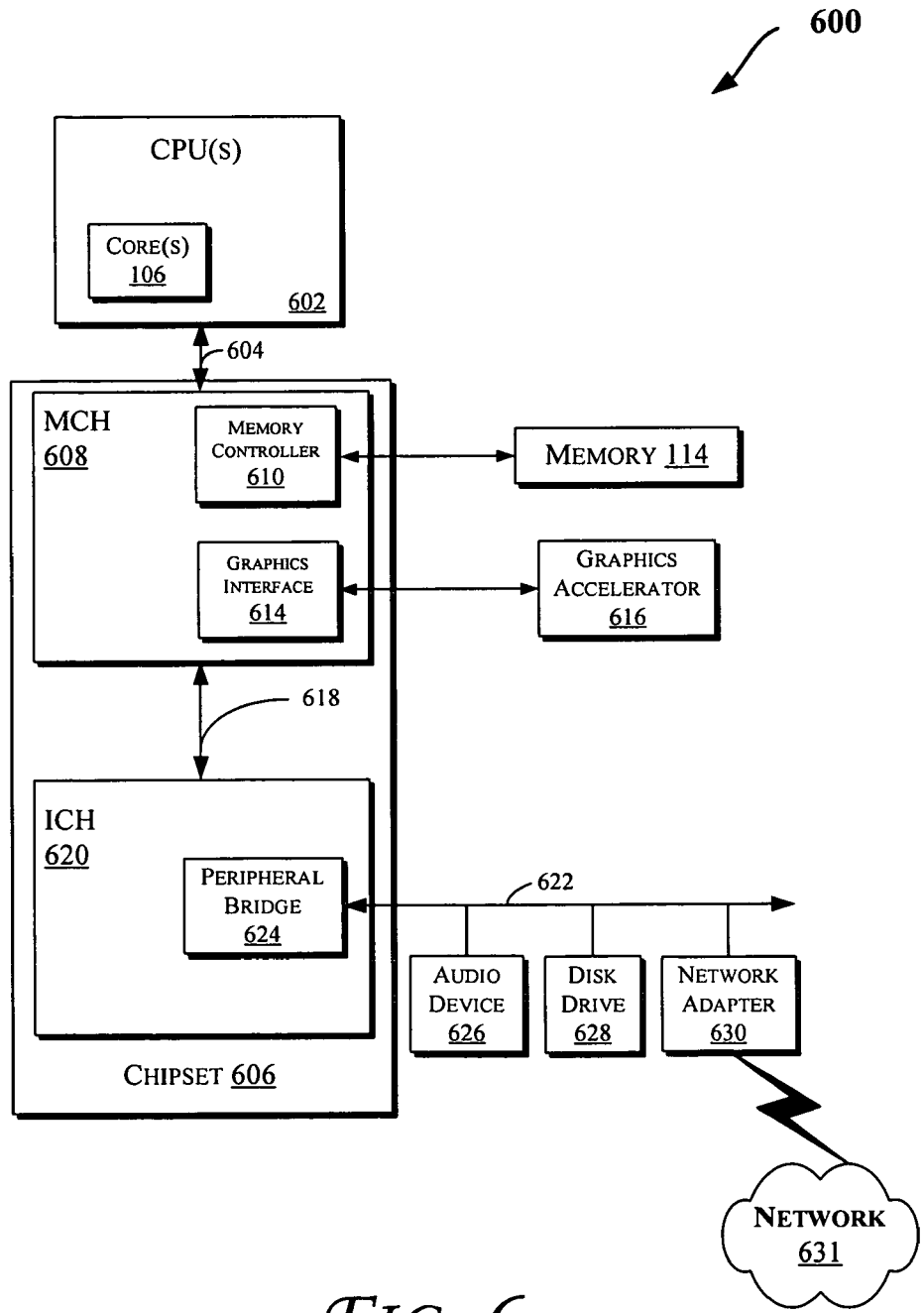

FIG. 6 illustrates a block diagram of an embodiment of a computing system 600. The computing system 600 may include one or more central processing unit(s) (CPUs) or processors 602 that communicate with an interconnection (or bus) 604. In an embodiment, the processors 602 may be the same as or similar to the processors 102 of FIG. 1. Also, the interconnection 604 may be the same as or similar to the interconnections 104 and/or 112 discussed with reference to FIGS. 1-2. The processors 602 may include any type of a processor such as a general purpose processor, a network processor (e.g., a processor that processes data communicated over a computer network), or another processor, including a reduced instruction set computer (RISC) processor or a complex instruction set computer (CISC) processor. Moreover, the processors 602 may have a single or multiple core design, e.g., including one or more processor cores (106) such as discussed with reference to FIGS. 1-2. The processors 602 with a multiple core design may integrate different types of processor cores on the same integrated circuit (IC) die. Also, the processors 602 with a multiple core design may be implemented as symmetrical or asymmetrical multiprocessors.

As shown in FIG. 6, a chipset 606 may communicate with the interconnection 604. The chipset 606 may include a memory control hub (MCH) 608. The MCH 608 may include a memory controller 610 that communicates with the memory 114. The memory 114 may store data, e.g., including sequences of instructions that are executed by the processors 602, or any other device in communication with the computing system 600. In one embodiment of the invention, the memory 114 may include one or more volatile storage (or memory) devices such as random access memory (RAM), dynamic RAM (DRAM), synchronous DRAM (SDRAM), static RAM (SRAM), or other volatile memory devices. Nonvolatile memory may also be used such as a hard disk. Additional devices may communicate via the interconnection 604, such as multiple processors and/or multiple system memories.

The MCH 608 may additionally include a graphics interface 614 in communication with a graphics accelerator 616. In one embodiment, the graphics interface 614 may communicate with the graphics accelerator 616 via an accelerated graphics port (AGP). In an embodiment of the invention, a display (such as a flat panel display) may communicate with the graphics interface 614 through, for example, a signal converter that translates a digital representation of an image stored in a storage device such as video memory or system memory into display signals that are interpreted and displayed by the display. In various embodiments, the display signals produced by the display device may pass through various control devices before being interpreted by and subsequently displayed on the display.

Furthermore, a hub interface 618 may enable communication between the MCH 608 and an input/output (I/O) control hub (ICH) 620. The ICH 620 may provide an interface to I/O devices in communication with the computing system 600. The ICH 620 may communicate with a bus 622 through a peripheral bridge (or controller) 624, such as a peripheral component interconnect (PCI) bridge or a universal serial bus (USB) controller. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), or digital data support interfaces (e.g., digital video interface (DVI)).

The bus 622 may communicate with an audio device 626, one or more disk drive(s) 628, and a network adapter 630. The network adapter 630 may communicate with a computer network 631, e.g., enabling various components of the system 600 to send and/or receive data over the network 631. Other devices may communicate through the bus 622. Also, various components (such as the network adapter 630) may communicate with the MCH 608 in some embodiments of the invention. In addition, the processor 602 and the MCH 608 may be combined to form a single chip. Furthermore, the graphics accelerator 616 may be included within the MCH 608 in other embodiments of the invention.

In an embodiment, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media for storing electronic data (e.g., including instructions).

Figure 7:
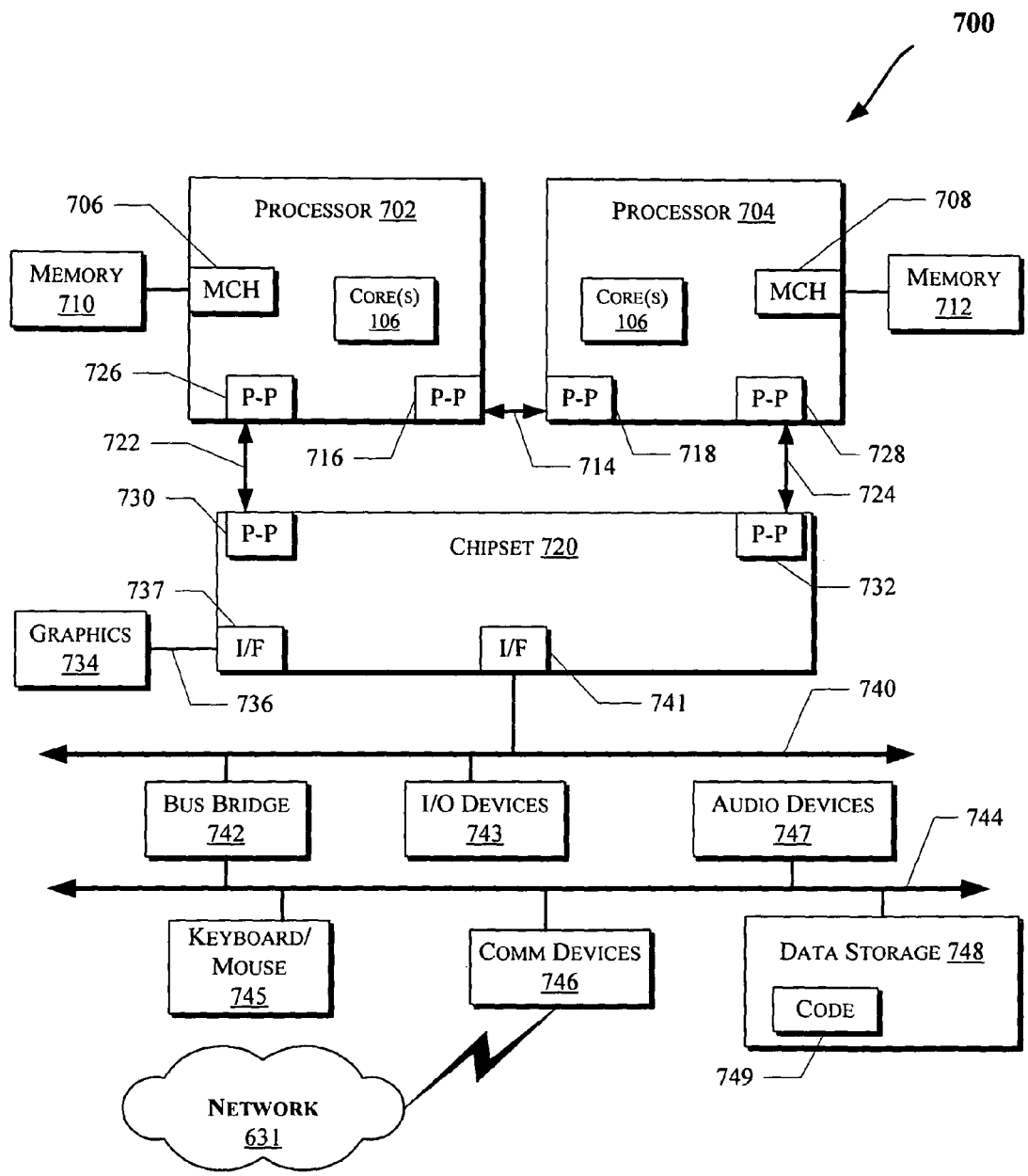

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 114 of FIGS. 1, 2, and 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

At least one embodiment of the invention may be provided within the processors 702 and 704. For example, one or more of the cores 106 of FIG. 1 or 2 may be located within the processors 702 and 704. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may communicate with a bus 740 using a PtP interface circuit 741. The bus 740 may have one or more devices that communicate with it, such as a bus bridge 742 and I/O devices 743. Via a bus 744, the bus bridge 743 may communicate with other devices such as a keyboard/mouse 745, communication devices 746 (such as modems, network interface devices (e.g., the network adapter 630 of FIG. 6), or other communication devices that may communicate with the computer network 631), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., circuitry), software, firmware, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
   a storage unit to store a value corresponding to a number of transactional memory access requests that are uncommitted; and
   a first logic to update the value stored in the storage unit for an occurrence of a transactional memory access request start and a transactional memory access request commitment,
   wherein a transactional memory load instruction, corresponding to the transactional memory request, is to be speculatively issued to a portion of a cache based on an indication of a previous transactional memory access to the portion of the cache, wherein the previous transactional memory access is to occur prior to the transactional memory load instruction speculatively accessing the portion of the cache and wherein the transactional memory load instruction is to be reissued, after retirement or commitment, in response to an absence of the previous transactional memory access to the portion of the cache.

2. The apparatus of claim 1, further comprising a second logic to store data corresponding to a state of one or more components of a processor, at least in part, in response to one of the transactional memory access requests.

3. The apparatus of claim 2, further comprising a third logic to restore the state of the one or more components of the processor after at least one of one or more operations corresponding to one of the transactional memory access requests fails to commit.

4. The apparatus of claim 2, further comprising a third logic to cause execution of one or more operations corresponding to at least one of the transactional memory access requests after an indication that the one or more operations are atomically committable.

5. The apparatus of claim 4, wherein the third logic causes execution of the one or more operations after the value stored in the storage unit indicates that a last one of the transactional memory access requests has been committed.

6. The apparatus of claim 2, wherein the one or more components of the processor comprises one or more registers.

7. The apparatus of claim 1, wherein the transactional memory access requests correspond to a same thread.

8. The apparatus of claim 1, further comprising the cache to store data, wherein the cache comprises one or more bits to indicate an access, corresponding to one of the transactional memory access requests, to a portion of the cache.

9. The apparatus of claim 8, wherein the portion of the cache is one or more of a cache line or a cache block.

10. The apparatus of claim 8, wherein one or more entries of the cache that correspond to at least one of the transactional memory access requests are evicted after other entries of the cache.

11. The apparatus of claim 1, further comprising a second logic to execute at least some of one or more operations corresponding to the transactional memory access requests speculatively.

12. The apparatus of claim 1, wherein at least some of one or more operations corresponding to the transactional memory access requests are identified as transactional or non transactional.

13. The apparatus of claim 1, further comprising a second logic to abort at least one of the transactional memory access requests in response to one or more of
a conflict with a different operation;
an implementation-specific event that forces an abort; or
a request for an explicit abort.

14. The apparatus of claim 1, further comprising a plurality of processor cores, wherein at least one of the plurality of processor cores comprises one or more of the first logic or the storage unit.

15. The apparatus of claim 1, further comprising a second logic to cause issuance of a load operation speculatively after a previous one of the transactional memory access requests has accessed a same location of a memory corresponding to the load operation.

16. The apparatus of claim 1, further comprising a second logic to cause execution of non-transactional stores corresponding to the transactional memory access as write-through operations to a memory.

17. The apparatus of claim 1, wherein the indication of the previous transactional access is to be stored in a location other than the cache and wherein the indication stored in the location other than the cache is to be accessed prior to accessing the cache.

18. A method comprising:
updating a stored value corresponding to a number of transactional memory access requests that are uncommitted in response to at least a first instruction corresponding to a transactional memory request;
performing one or more operations in response to a second instruction corresponding to the transactional memory request; and
speculatively issuing a transactional memory load instruction, corresponding to the transactional memory request, to a portion of a cache based on an indication of a previous transactional memory access to the portion of the cache, wherein the previous transactional memory access is to occur prior to the transactional memory load instruction speculatively accessing the portion of the cache and wherein the transactional memory load instruction is to be reissued, after retirement or commitment, in response to an absence of the previous transactional memory access to the portion of the cache.

19. The method of claim 18, further comprising updating the stored value in response to the second instruction.

20. The method of claim 18, further comprising check pointing one or more components of a processor in response to the first instruction.

21. The method of claim 18, wherein speculatively issuing the load instruction is to be performed based on a bit corresponding to the portion of the cache.

22. The method of claim 18, further comprising identifying one or more instructions corresponding to the transactional memory request as transactional or non-transactional.

23. The method of claim 22, wherein identifying the one or more instructions is performed implicitly or explicitly.

24. A system comprising:
a memory to store data;
a processor comprising:
a first logic to fetch a first instruction from the memory corresponding to a start of a transactional memory access and a second instruction from the memory corresponding to an end of the transactional memory access; and
a second logic to update a value stored in a storage unit in response to one or more of the first instruction and the second instruction,
wherein a transactional memory load instruction, corresponding to the transactional memory request, is to be speculatively issued to a portion of a cache based on an indication of a previous transactional memory access to the portion of the cache, wherein the previous transactional memory access is to occur prior to the transactional memory load instruction speculatively accessing the portion of the cache and wherein the transactional memory load instruction is to be reissued, after retirement or commitment, in response to an absence of the previous transactional memory access to the portion of the cache.

25. The system of claim 24, further comprising a third logic to cause execution of one or more operations on the memory after an indication that the one or more memory operations are atomically committable.

26. The system of claim 24, further comprising a third logic to restore a state of one or more components of the processor after at least one of one or more operations corresponding to the transactional memory access fails to commit.

27. The system of claim 24, wherein the value stored in the storage unit corresponds to a number of transactional memory access requests that are uncommitted.

28. The system of claim 24, wherein the second logic updates the value stored in the storage unit in response to execution or issuance of the first or second instructions.

29. The system of claim 24, further comprising the cache to store at least some of the data stored in the memory, wherein the cache comprises one or more bits to indicate an access, corresponding to the transactional memory access, to a portion of the cache.

30. The system of claim 29, further comprising a third logic to update data stored in the cache in response to one or more operations corresponding to the transactional memory access.

31. The system of claim 24, further comprising an audio device.

\* \* \* \* \*